United States Patent Office 2,970,433
Patented Feb. 7, 1961

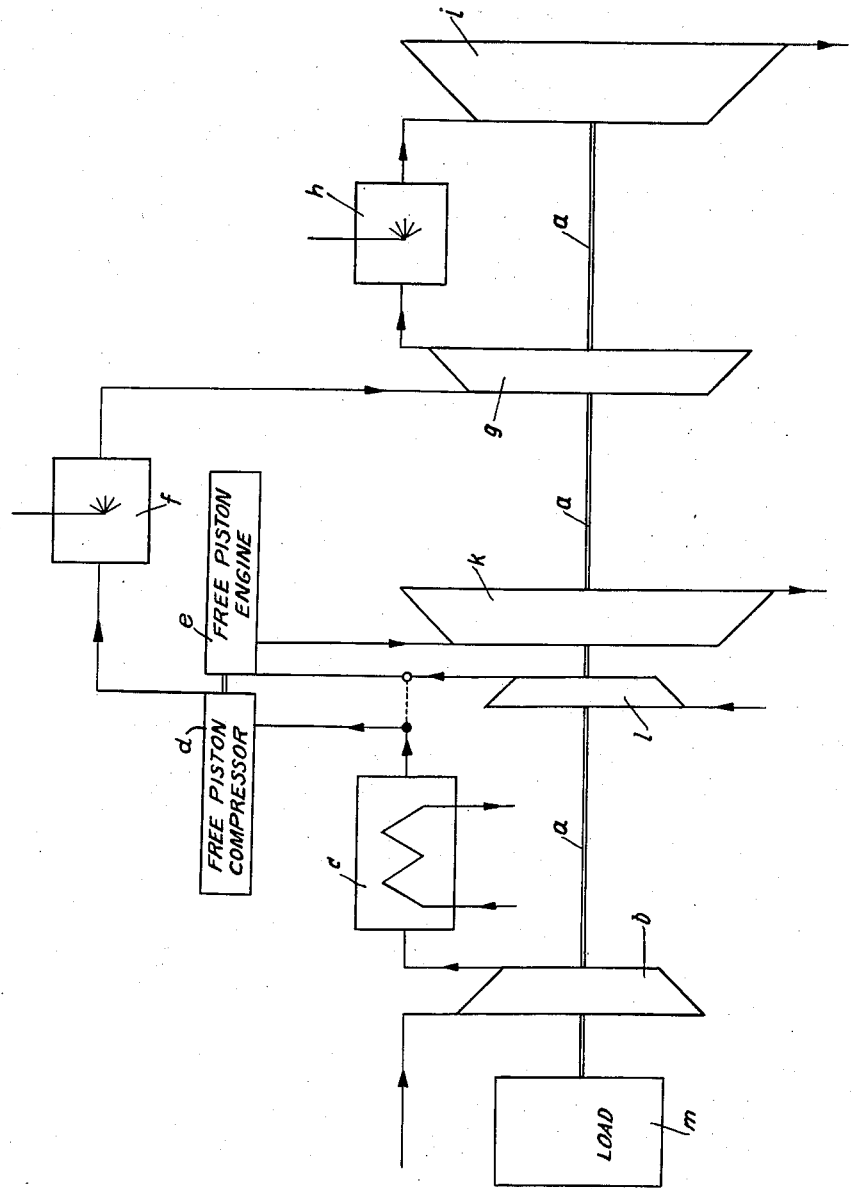

2,970,433

COMPOUND GAS TURBINE PLANTS

Johann Endres, Wackersberg, near Bad Tolz, Germany, assignor to The Messerschmitt A.G., Augsburg, Germany Filed June 10, 1957, Ser. No. 664,623

Claims priority, application Germany June 11, 1956

1 Claim. (Cl. 60—39.17)

This invention relates to an open cycle high-pressure gas turbine power unit in which the high pressure stage is embodied in a free piston engine compressor.

Since compound gas turbine power units employing intermediate reheat and intercooling require high compression ratios, both in stationary and mobile plants, compression must be divided into a low pressure stage and a high pressure stage.

On this basis open cycle gas turbine power units with a double-shaft form of construction have been built which give compression ratios of about 12:1.

It is a known disadvantage inherent in these power units that about two-thirds of the power which should be transferred to the shaft is internally consumed in compression and that their overall efficiency, at a propulsion efficiency of the gas turbine of 20–25%, is comparatively low owing to the power consumed by the turbo-compressors.

The high compression ratios of over 12:1 required in a compound plant cannot be provided by turbo-compressors owing to this efficiency loss, so that a displacement type of compressor should be introduced into the cycle in the high pressure stage. However displacement type compressors including piston-type compressors are structurally unsuited for use in the high pressure stage of a gas turbine process for reasons connected with the problem of driving them.

The present invention avoids the disadvantages inherent in the proposals that have already been made and provides a fresh basis for securing the required high efficiencies and high specific performances by introducing into the gas turbine cycle a high pressure compression stage of special construction and provided with separate drive means.

The primary object of the invention is to provide a high pressure gas turbine power unit having optimum efficiency and performance which is achieved by combining the advantages of the flow-type of engine in the low pressure range, i.e. its high intake capacity, and of the piston type engine in the high pressure range.

The invention is characterised in that the low-pressure compressor is a turbo-compressor and the high-pressure compressor a free-piston type of engine-driven compressor, the free-piston compressor further compressing the pre-compressed air from the low-pressure turbo-compressor to the optimum pressure of the high pressure combustion chamber, whilst the exhaust gases from the free-piston engine, mixed with supercharging or scavenging air derived from the low pressure turbo-compressor or from the high-pressure free-piston compressor or from a special engine supercharger, are taken to an exhaust turbine provided in the power line of the turbine plant, preferably on the main turbine shaft.

The accompanying drawing illustrates an embodiment of the invention by way of example, but the invention must not be understood as being limited to this example which merely serves to clarify the principal features of the invention to enable the invention to be the more readily understood.

In the drawings: the reference letters have the following significance:

$a$ is the main turbine shaft,
$b$ is the low-pressure turbo-compressor,
$c$ is the intercooler,
$d$ is the high-pressure free-piston compressor,
$e$ is the free-piston engine,
$f$ is the high-pressure combustion chamber,
$g$ is the high-pressure turbine,
$h$ is the low-pressure combustion chamber,
$i$ is the low-pressure turbine,
$k$ is the exhaust gas turbine,
$l$ is the engine supercharger,
$m$ is the load.

The illustrated compound gas-turbine plant operates as follows:

The low-pressure turbo-compressor $b$ on the mainshaft $a$ draws in air from the atmosphere and compresses the same to an optimum intermediate pressure. The precompressed air is cooled in the intercooler $c$ and enters the compression chambers of the high-pressure compressor $d$ where compression to optimum pressure in the cycle is effected. The high-pressure compressor $d$ is a free-piston type of compressor driven by a free-piston engine $e$. The highly compressed air then reaches the high-pressure combustion chamber $f$ where it is heated to a definite maximum temperature by fuel injection and a further supply of heat. The combustion gases are then conducted to the high-pressure turbine $g$ and deliver part of their energy of expansion to the mainshaft $a$. The partially expanded gases now reach the low-pressure combustion chamber $h$ where a further injection of fuel reheats them to maximum temperature for complete expansion in the low-pressure turbine $i$ where they deliver the balance of their energy to the mainshaft.

The exhaust gases from the free-piston engine $e$ are passed to an exhaust gas turbine $k$ which also delivers torque to the mainshaft $a$. The mainshaft $a$ drives the low-pressure compressor $b$ and, if required, the engine supercharger $l$ which supercharges atmospheric air and blows it into the combustion chambers of the free-piston engine $e$ for supercharging or scavenging or into the engine exhaust. In other words, the free-piston engine $e$ works with a high excess of air so that the exhaust turbine $k$ can transfer a considerable amount of additional power to the mainshaft $a$.

If the engine supercharger is omitted the air for supercharging or scavenging can be derived from the low pressure stage behind the intercooler or preferably from the high-pressure stage behind the free-piston compressor, an arrangement which will then substantially raise the pressure and temperature levels of the engine exhaust and hence the power and efficiency of the whole plant. The total surplus power of the mainshaft $a$ is then available for transmission to the load $m$. To enable the operational characteristics of the different flow-type power units to be properly matched by a suitable operational lay-out, the compound gas-turbine plant may be constructed in the form of a single or multiple shaft plant.

The advantages of the invention are embodied in the following factors:

(1) By introducing a free-piston compression stage to serve as the high-pressure stage in the gas turbine cycle high compression is effected at twice the propulsive efficiency of a gas turbine, as a result of which the overall efficiency of the plant increases into the range of diesel engine efficiencies, the rise in efficiency being the greater, the larger the proportion of total compression represented by the free-piston stage by comparison with the turbo-compressor stage.

(2) The specific performance of the plant is increased by intercooling and intermediate reheating under the high pressure conditions which are obtainable only by the introduction of a free-piston stage, and may reach values in the region of over 800 H.P./kg. of air passed through the plant.

(3) Owing to the preliminary compression obtained in the low-pressure turbo-compressor stage large quantities by weight of air of low specific volume can be used in the free-piston compressor stage so that a very high absolute performance can be secured.

(4) The effective useful turbine output is increased to high values by the employment of secondary drive means in the high-pressure compression stage, values which depend upon the effective performance of the free-piston stage.

(5) The exhaust gases of the free-piston engine are delivered at optimum pressure to an additional turbine in the power circuit of the main turbine, the process of gas exchange in the free-piston engine, supercharging and scavenging, being effected with the aid of the high pressure air from the free-piston compressor, another factor which increases the efficiency of the plant.

The cycle employed by the invention is applicable both to stationary and mobile plants for powering flow-type machinery, generators, rail motor vehicles, and ships, and for the generation of power.

On the one hand, the cycle gives high efficiencies in the order of magnitude of diesel engines and, on the other hand, high specific performances which open up fresh possibilities for the further development of the gas turbine.

Various changes and modifications may be made without departing from the spirit and scope of the present invention and it is intended that such obvious changes and modifications be embraced by the annexed claim.

Having thus described the invention, what is claimed as new and desired to be secured by Letters Patent, is:

A compound gas turbine plant comprising a main turbine shaft for driving a load, a low pressure compressor driven by said shaft, a high pressure free piston compressor, a free piston engine driving said high pressure compressor separately from said shaft, said low pressure compressor supplying air under an intermediate pressure to said high pressure compressor, a high pressure turbine mounted on said shaft for driving said shaft, a high pressure combustion chamber interconnected between said high pressure compressor and said high pressure turbine for heating air under high pressure from said high pressure compressor and for supplying said high pressure heated air to said high pressure turbine, a low pressure turbine mounted on said shaft for further driving said shaft, a low pressure combustion chamber interconnected between said high pressure turbine and said low pressure turbine for heating partially expanded gases from said high pressure turbine and supplying heated gases to said low pressure turbine, an exhaust gas turbine mounted on said shaft further driving said shaft, said exhaust gas turbine being connected to said free piston engine so that exhaust gases of combustion from said free piston engine serve to drive said exhaust gas turbine, an intercooler interconnected between said low pressure compressor and said high pressure compressor, and an engine supercharger driven by said shaft for supplying air for supercharging and scavenging said free piston engine.

References Cited in the file of this patent

UNITED STATES PATENTS

| | | |
|---|---|---|
| 2,407,166 | Kreitner et al. | Sept. 3, 1946 |
| 2,518,062 | Pouit | Aug. 8, 1950 |
| 2,535,488 | Dros | Dec. 26, 1950 |
| 2,585,968 | Schneider | Feb. 19, 1952 |

FOREIGN PATENTS

| | | |
|---|---|---|
| 1,094,386 | France | Dec. 8, 1954 |